United States Patent [19]

Takaragi et al.

[11] Patent Number: 5,144,665
[45] Date of Patent: Sep. 1, 1992

[54] CRYPTOGRAPHIC COMMUNICATION METHOD AND SYSTEM

[75] Inventors: Kazuo Takaragi, Ebina; Yasuhiro Ishii, Hadano; Tsutomu Nakamura, Musashino, all of Japan

[73] Assignee: Hitachi, Ltd., Tokyo, Japan

[21] Appl. No.: 658,528

[22] Filed: Feb. 21, 1991

[30] Foreign Application Priority Data

Feb. 21, 1990 [JP] Japan .................................. 2-038221

[51] Int. Cl.$^5$ ............................................... H04K 1/00
[52] U.S. Cl. ........................................ 380/30; 380/21; 380/45
[58] Field of Search .............................. 380/21, 30, 45

[56] References Cited

U.S. PATENT DOCUMENTS

| | | | |
|---|---|---|---|
| 4,238,853 | 12/1980 | Ehrsam et al. | 380/45 |
| 4,386,234 | 5/1983 | Ehrsam et al. | 380/45 |
| 4,503,287 | 3/1985 | Morris et al. | 380/45 |
| 4,683,968 | 8/1987 | Appelbaum et al. | 380/45 |
| 4,850,017 | 7/1989 | Matyas, Jr. et al. | 380/21 |
| 4,956,863 | 9/1990 | Goss | 380/30 |

OTHER PUBLICATIONS

Journal of Engineers Institute of Electronic Information Communication of Japan, D-1, vol. J75-D-1, No. 3, pp. 213-220, (Mar. 1989) "A Method for Rapid RSA Key Generation", Gōtoh et al.

*Primary Examiner*—Salvatore Cangialosi
*Attorney, Agent, or Firm*—Antonelli, Terry Stout & Kraus

[57] ABSTRACT

A cryptographic communication method and system for performing cryptographic communication between a host computer and a given one of plural terminals connected to the host computer by way of a communication network by using a data key designated by the given terminal or the host, wherein the host computer includes a cryptographic processing unit which includes a processing part for performing a public key cryptographic processing by using a pair of a public key and a private key and a common key cryptographic processing by using a common key, and an internal memory for storing master common key and master private key, a storage for recording as user private key information those data that result from the public key cryptographic processing performed by using a master public key on a plurality of user private keys which are in paired relation to user public keys held in the user terminals, respectively, and control means for performing input/output control between the storage and the cryptographic processing means.

13 Claims, 10 Drawing Sheets

CRYPTOGRAPHIC COMMUNICATION METHOD AND SYSTEM

BACKGROUND OF THE INVENTION

The present invention relates generally to a cryptographic communication method and a system for carrying out the same in which a host computer and a given one of user terminals can mutually perform a cryptographic communication by way of a communication network. More particularly, the present invention is concerned with a cryptographic communication method and a system therefor in which a data key used for encryption (ciphering) or decryption (deciphering) can be designated by either one of the host computer and a given one of the user terminals.

With progress in the information processing and communication techniques, it is expected that the information processing system promises great benefits to the human being. In this connection, it goes without saying that the information processing system must necessarily be provided with sufficient and satisfactory measures in respect to the security protection for the content of data, messages and other information to be processed.

The heart of the information processing system is constituted by a main frame computer, from which a network are being developed and expanded on a worldwide scale while overcoming the geographical and temporal constraints. From the view point of the security measures, it is of great significance to impart a function or capability of cryptographic communication (crypto-communication) to such main frame computer.

As the prior art technique for imparting the cryptographic communication function to the main frame computer, it has already been proposed a system in which a cryptographic apparatus is externally connected to the main frame computer.

FIG. 9 of the accompanying drawings is a diagram for illustrating a typical one of such systems known heretofore.

Referring to the figure, a host system 1008 is arranged to communication with any given one of terminals 1001, 1002, ..., 1005 by way of a communication network 1007. It is assumed that a cryptographic key KMT1(1002) is stored or held previously in the terminal 1001. On the other hand, there is also stored in a storage unit 1016 incorporated in the host system 1008 a cryptographic key in an encrypted (ciphered) form of ($E_{KM1}$(KMT1) 1017).

Let's represent by a symbol $E_x(Y)$ an encrypted message generated through a common key cryptographic processing of data (Y) by using a key (x). With the phrase "common key cryptographic processing", it is intended to mean such a cryptographic processing in which one and same common cryptographic key (x in this case) is employed for both the encryption (which may be expressed, for example, in the form of a function "$E_x$ (ordinary message)") and decryption (which may be expressed, for example, in the form of a function "$D_x$ (encrypted message)").

Of course, the common cryptographic key may be set up between the host system 1008 and the terminals 1003, ..., 1005, respectively, through similar processings.

In the host system 1008, a host main unit (corresponding to the main frame computer) 1009 reads out from the storage unit 1015 the encrypted cryptographic key ($E_{KM1}$(KMT1) 1017) and places it in a memory 1020 incorporated in the host main unit itself. Subsequently, the host main unit 1009 supplies as input data to a cryptograph machine or unit 1013 the encrypted cryptographic key $E_{KM1}$(KMT1) together with a random number R1012 generated at random (which will ultimately have a relation given by $R = E_{KM0}$(KS) to a data KS, as will be described hereinafter), whereon a numerical value $E_{KMT1}$(KS) given as the Output data from the cryptograph unit 1013 is held in a memory 1010. For generating the numerical key value $E_{KMT1}$(KS), the cryptograph unit 1013 performs the undermentioned processings by using the input data $E_{KM1}$(KMT1) 1020, the random number R1012 and master keys KM0 (denoted by 1014) and KM1 (1015). They are:

| Input: | IN1 | ← | $E_{KM1}$ | (KMT1) |
|---|---|---|---|---|
| | IN2 | ← | R | |
| Computation: | KMT1 | ← | $D_{KM1}$ | (IN1) |
| | KS | ← | $D_{KM0}$ | (IN2) |
| | WORK | ← | $E_{KMT1}$ | (KS) |
| Output: | OUT | ← | WORK | |

Parenthetically, concerning the abovementioned processings, reference may be made to a publicly circulated literature mentioned hereinafter, p. 252, "RFMK Operation". By virtue of the above processing, the host main unit 1009 can generate an encrypted message or statement $E_{KMT1}$(S) 1010 which is capable of being decrypted or deciphered by using the cryptographic key KMT 1 (1002) held in the terminal 1001. The encrypted message $E_{KMT1}$(KS) 1001 is then transmitted to the terminal 1001 via the communication network 1007.

When the terminal 1001 and the host system 1008 perform mutually the cryptographic communication, encryption of data to be transmitted and decryption of the data received are carried out with the aid of the cryptographic key (KS) generated from a random number.

Now, let's assume that an attempt is made for wiretapping data which is being transmitted over the communication network. In that case, however, it is only the terminal 1001 and the host system 1008 that can decrypt the cryptographic key used for the generation of the encrypted key data $E_{KMT1}$(KS). The terminals 1003 to 1005 can not decrypt this data because the key KMT1 is not available for them. Accordingly, there is no possibility that the encrypted message might be decrypted with the contents thereof being clarified by the users of the terminals 1003, ..., 1005 and the wiretapper 1021 which is attacking the communication network 1007.

The prior art technique mentioned above is discussed in detail in Carl H. Meyer and Stephen M. Matys' "ANGOU", Shizensha Co., February 1987, pp. 195–B357, Japanese Edition (Original: "CRYPTOGRAPHY: A NEW DIMENSION IN COMPUTE DATA SECURITY" 1982, by John Wiley and Sons. Inc. New York).

In addition to the common key cryptographic processing in which a same common cryptographic key is used for both the encryption and the decryption, as described above, there is also known a system in which the cryptographic communication is performed by using a pair of different keys referred to as a public key and a private key, respectively, for the encryption and the decryption.

FIG. 10 of the accompanying drawings shows a general arrangement of a system in which a cryptographic communication is realized by a combination of a common key cryptographic processing and a public key cryptographic processing.

Referring to the figure, a first communication apparatus 1100 is connected to a second communication apparatus 1200 via a communication network (illustration of which is omitted). For setting up a data key, random data key (K) is first generated in the communication apparatus 1100, whereon the data key (K) is encrypted through the public key cryptographic processing performed by using a public key (P) in a public key cryptographic processing part 1101. The encrypted data key may be expressed in the form of PSAp (K).

Subsequently, the encrypted data key PSAp(K) is transmitted to the second communication apparatus 1200 also referred to as the destination apparatus. In the destination communication apparatus 1200, the public key cryptographic processing is performed on the received cryptographic data PSAp(K) by using a private key (S) to thereby obtain the data key (K) by decryption. Thereafter, encryption of the data to be transmitted or decryption of the received data is performed in encryption/decryption processing parts 1102 and 1202 of the communication apparatuses through a common key cryptographic processing in which the data key (K) is used as the common key.

A typical one of the systems for the cryptographic communication based on the combination of the common key cryptographic processing and the public key cryptographic processing is disclosed in Deffie et al's "New Directions in Cryptography": IEEE, Transactions on Information Theory, Vol. IT22, No. 6, November 1976.

In practical applications, the main frame computer (also referred to as the host) described above is, by nature, utilized by a great number or users. Under the circumstances, it is vitally important to prevent positively such unwanted situation in which a third party having the right to make access to the host wire taps data from the communication network and decipher or decrypt the data with the aid or the host. Besides, in addition to the security protection of data against the decryption by a third party, it is also important that the data key (KS) for allowing the cryptographic communication to be executed can be designated not only by the host but also any terminal which demands the cryptographic communication.

Parenthetically, in conjunction with the protection against the unauthorized decryption by a third party, possibility of such description is discussed in Meyer et al "ANGOU" cited previously.

More specifically, let's assume that a user A generates the data $E_{KMT1}(KS)$ 1010 and sends it to the terminal 1001, as a result of which the data cryptographic key KS is shared between the user A and the terminal 1001 In that case, it is further assumed that another user B having the right to access the cryptograph unit 1013 and the storage unit 1016 taps and records the key data $E_{KMT1}(KS)$ 1010 and an encrypted message $E_{KS}(data)$ from a communication network 1007 with a malicious intention to decrypt or decipher the encrypted message. To this end, the user B who wants to obtain the data "data" by deciphering the encrypted message will have to read out the key data $E_{KM1}(KMT1)$ from the storage unit 1016 and perform the following processings.

| Input: | IN1 | ← $E_{KM1}$ | (KMT1) |
|---|---|---|---|
| | IN2 | ← $E_{KMT1}$ | (KS) |
| Computation: | KMT1 | ← $D_{KM1}$ | (IN1) |
| | KS | ← $D_{KMT1}$ | (IN2) |
| | WORK | ← $E_{KM0}$ | (KS) |
| Output: | OUT | ← WORK | |

(Refer to Meyer et al, pp. 265-266, "RETKEY Macroinstruction.")

When the user B can obtain the data "OUT=$E_{KM0}$(KS), he or she can decipher the encrypted message $K_{KS}$(data) by performing the following processings:

| Input: | IN1 | ← $E_{KM0}$ | (KS) |
|---|---|---|---|
| | IN2 | ← $E_{KS}$ | (data) |
| Computation: | KS | ← $D_{KM0}$ | (IN1) |
| | data | ← $D_{KS}$ | (IN2) |
| Output: | OUT | ← data | |

(see Mayer et al, p. 250, "Data Decrypting Operation DCPH.)

Of course, Meyer et al have proposed the measures for inhibiting the data decryption by a third party. More specifically, in the course of computation of the RETKEY macro-instruction, decryption by using a master key KM1 and encryption by using a master key KM0 are inhibited (refer to Meyer et al, pp. 266-269). However, when such inhibition rule is set up, the designation of the data key from the terminal which is the second important subject matter under consideration, as described hereinbefore, is then rendered impossible.

By way of example, it is assumed that the terminal 1001 desires to share a data key KS' by designating and sending $E_{KMT1}(KS')$ to a host. In that case, in order to obtain the data key KS', the host will have to perform the processing mentioned below:

$E_{KMT1}(KS') \rightarrow E_{KMT0}(KS')$

It is however apparent that this processing can not be executed because of the inhibition rule described above.

In the system disclosed in Deffie et al "New Directions in Cryptography", data decryption or deciphering by a third party is impossible so far as the private key (S) for deciphering the data key (K) remains unknown. However, it is undesirable from the viewpoint of security that the user inputs such important private key every time he or she uses a data terminal.

In particular, in the case of a host which is used by many and unspecified persons and in which the users are forced lo input respective private keys through keyboards or the like input equipment for deciphering encrypted messages or statement, there may arise such possibility that a malicious third party acquires surreptitiously by glancing at the data being inputted through the keyboard. Further, dumped data held internally of the host for a predetermined period for use by a maintenance engineer may be leaked to a third party for some reason. In either case, the user's private keys are made available intact to the third party.

When the user's private keys are recorded in a memory incorporated in cryptograhic equipment which is designed to be externally connected to the main frame computer, leakage of the private keys to the third party can not occur. However, it is undesirable for a system manager or owner that the user's private keys which must be rewritten instantly in response to increase or decrease in the number of system subscribers are left to the management of a manufacturer of the cryptograph machine Thus, it is an important problem to be solved in what manner the user's private keys should be recorded in the memory incorporated in the host main unit externally of the cryptograph machine without incurring any risk of leakage to any third party.

SUMMARY OF THE INVENTION

It is therefore an object of the present invention to provide a cryptographic communication method and a system for carrying out the same which includes a host computer and a plurality of user terminals interconnected by way of a communication network and which can positively prevent a third party obtained an ecrypted message by wiretapping from the communication network from deciphering that message.

Another object of the present invention is to provide a cryptographic communication method and a system therefor which allows the data key required for deciphering or decrypting an encrypted message to be designated not only by a host computer but also by terminals independent of one another.

It is a further object of the present invention to provide a cryptographic communication system in which a storage unit of a host system is imparted with a function for generating the data keys required for decrypting encrypted messages.

In view of the above and other objects which will be apparent as description proceeds, there is provided according to an aspect of the present invention a cryptographic communication system in which a host computer comprises a cryptographic processing part for performing a public key cryptographic processing by using a pair of a public key and a private key for encryption and description and a common key cryptographic processing by using a same common key, a storage or memory part for recording as user private key information those data that result from the public key cryptographic processing performed by using a master public key on a plurality of user private keys which are in paired relation to user public keys held internally of the user terminals, respectively, and a control part for performing input/output control of the cryptographic processing part and the storage unit. When the data key is designated in a mode in which the cryptographic communication is to be performed by using a data key designated by a user terminal, the user private key information corresponding to the user terminal destined for communication is read out from the storage or memory unit. The user private key is then decrypted from the user private key information through the public key cryptographic processing by using a master private key held internally of the cryptographic processing part. Subsequently, data key is decrypted from the key designation information through the public key cryptographic processing by using the user private key. Finally, key information generated on the basis of the data key through the common key cryptographic processing performed by using the master common key held internally of the cryptograph unit (machine) is placed in the control part. In the succeeding cryptographic communication, the data key is generated through the common key cryptographic processing by using the master common key internally of the cryptographic processing part for every encryption or decryption of a message for communication, whereon the message is encrypted or decrypted through the common key cryptographic processing by using the abovementioned data key.

On the other hand, the host computer records in the storage unit a plurality of the user public keys which are paired with the user private keys held by the user terminals, respectively. When the data key is designated in a mode in which the host computer performs cryptographic communication by using the data key designated by the host computer, a given random number is held by the control part as the key information, whereon the data key is generated from the key information through the common key cryptographic processing by using the master common key, and the user public key corresponding to the destination user terminal is read out from the storage unit. The key designation information is generated from the data key through the public key cryptographic processing performed by using the abovementioned user public key, whereupon the key designation information is transmitted to the destination user terminal. In the succeeding cryptographic communication, the data key is generated from the key information through the procedure as described above. The data key thus generated is used for performing the encryption or decryption of the message which is effectuated through the common key cryptographic processing.

Each of the user terminals includes a user storage unit for storing the user public key and the user private key and a user cryptograph unit for performing the public key cryptographic processing and the common key cryptographic processing. When the data key is designated in a mode in which the cryptographic communication is to be performed by using the data key designated by the user terminal, the key designation information is generated from the data key through the public key cryptographic processing performed by using the user public key recorded in the user storage or memory unit. The key designation information thus generated is then transmitted to the host computer. When the data key is designated in a mode in which the cryptographic communication is to be performed by using the data key designated by the host computer, the public key cryptographic processing is performed by using the user private key recorded in the user storage or memory, whereby the data key is generated from the key designation information received from the host computer.

As will be understood from the foregoing, according to the inventive communication system, a plurality of user private keys are recorded in the storage or memory unit incorporated in the host computer in the paired relation to the user public keys held internally of the user terminals, respectively, in the form undergone the public key processing by using the master public key (i.e. as the user private key information). Thus, when the data key is decrypted or deciphered from the key designation information received from the user terminal upon performing the cryptographic communication by using the data key designated by the user terminal, the user private key can not make appearance intact (i.e. in the naked form) externally of the cryptograph machine or unit, whereby secrecy can be ensured. Further, since the deciphered data key can not make appearance intact (i.e. in the naked from) externally of the cryptograph unit or machine, not only the decoding or decryption of the encrypted message by a third party is rendered impossible but also the user private keys and the data keys are prevented against presentation even to the maintenance engineer of the host system in the forms as they are.

Each of the user terminals needs to be equipped with only the storage or memory part for storing the user public key and the user private key, and the cryptographic part for performing the public key cryptographic processing and the common key cryptographic processing. Thus, the data terminal disclosed in the previously cited literature "New Directions in Cryptography" may be employed without any further modification or alteration.

DETAILED DESCRIPTION OF THE PREFERRED EMBODIMENTS

Now, the present invention will be described in detail in conjunction with exemplary or preferred embodiments thereof by reference to the accompanying drawings.

Figure 1:
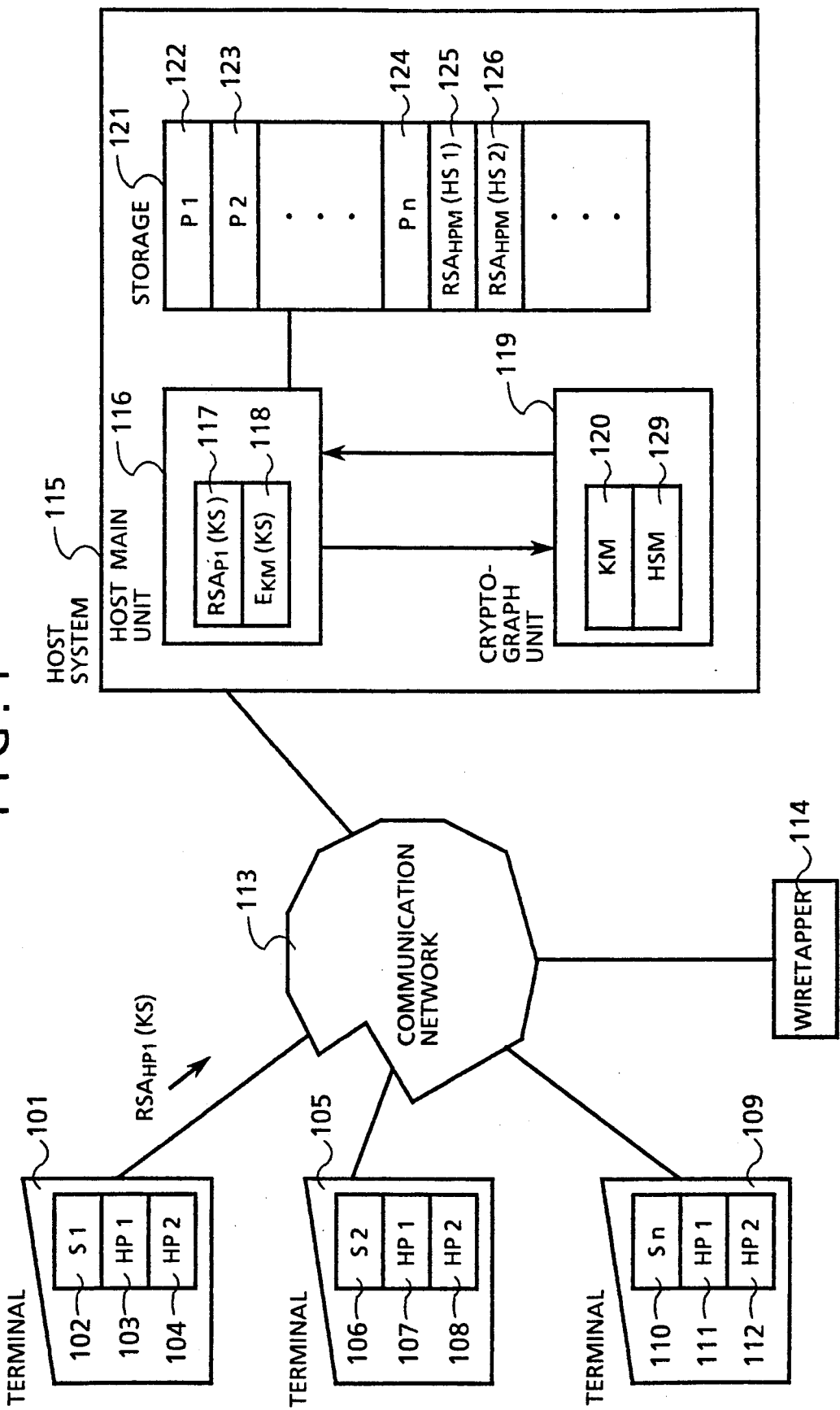
FIG. 1 is a schematic diagram showing a general arrangement of a cryptographic communication system according to an embodiment of the invention.

FIG. 1 is a block diagram showing schematically a general arrangement of a cryptographic communication system to which the present invention is applied.

Referring to the figure, a host system 115 is adapted to communicate with terminals 101, 105, ... and 109 by way of a communication network 113. For the terminal 101, there are previously set up a private key S1 (denoted by 102), a first public key HP1 (103) a second public key HP2 (104) in accordance with the RSA public key cryptosystem. The private key S1 is kept secret in the terminal 101. At this juncture, it should be mentioned that the RSA cryptosystem is known as one of the public key cryptosystems proposed by Rivet, Shamic and Adlemon. Similarly, for each of the terminals 105, ... and 109, the private key as well as the public keys conforming to the RSA public key cryptosystem. The host system 115 includes a storage unit 121 which is constituted by a memory 125 and a memory 126. The public keys (P1 to Pn) associated in pairs with the private keys (S1 to Sn) held internally of the individual terminals, respectively, and the private keys HS1 and HS2 which are also in paired relation with the public keys HP1 (103) and HP2 (104), respectively, are stored in the memories 125 and 126 in the forms of $RSA_{HPM}(HS1)$ and $RSA_{HPM}(HS2)$ which are resulted from encryption processing of the above-mentioned keys by using a master public key HPM, respectively. For the memory 125, only a user identified by A has the right to make access thereto, while for the memory 126, only a user B has the right to access.

A cryptograph machine or unit 119 incorporated in the host system includes an internal memory the content of which can not be read out externally of the cryptograph machine or unit 119, wherein there are stored in the internal memory a master common key KM (120) and a master secrete key HSM (129). The cryptograph unit 119 is imparted with a RSA public key cryptographic processing function or capability for effectuating encryption (ciphering) and decryption (deciphering or decoding) by using a pair of a public key and a private key and a common key cryptographic processing function for effectuating the encryption and decryption by using one and the same common key. Parenthetically, it should be noted that these cryptographic processing functions are also imparted to the individual terminals, respectively.

In the case of the illustrated embodiment, it is assumed that the public keys P1 to Pn and the private keys S1 to Sn, the public keys HP1, HP2 and the private keys HS1, HS2 and the master public key HPM and the master private key HSM bear, respectively, correspondence relations mutually, as in the case of the paired relation between the public key and the private key mentioned previously. The common key includes the master common key KM (120) or a data key (KS) which will be described below.

The cryptographic communication system according to the illustrated embodiment of the invention has a mode in which a given one of the terminal performs a cryptographic communication with the host system 115 by using the data key KS designated by that given terminal on one hand and a mode in which the host system 115 performs the cryptographic communication with a given one of the terminals by using the data key KS' designated by the host 115.

In the first place, description will be made of the cryptographic communication by using the data key KS designated by a given one of the terminals (e.g. terminal 101). In this connection, let's assume that a user of the terminal 101 arbitrarily determines a data encrypting key KS which is to be used in common or shared by a user who is attending the host system 115. In that case, the terminal 101 arithmetically determines the encrypted key information $RSA_{HP1}(KS)$ by using the public key HP1 and sends the key information $RSA_{HP1}(KS)$ to the user A of the host system 115. Upon reception of $RSA_{HP1}(KS)$, the user A makes access to the memory 125 to acquire the key information $RSA_{HPM}(HS1)$ to thereby allow the cryptograph unit 119 to perform the processings mentioned below.

| Input: | IN1 | ← | $RSA_{HP1}$ | (KS) |
| | IN2 | ← | $RSA_{HPM}$ | (HS1) |
| Computation: | HS1 | ← | $RSA_{HSM}$ | (IN2) |
| | KS | ← | $RSA_{HS1}$ | (IN1) |
| | WORK | ← | $E_{KM}$ | (KS) |
| Output: | OUT | ← | WORK | |

Through the procedure mentioned above, the user A can acquire the encrypted key information $E_{KM}(KS)$ in the host main unit 116 and share the data encrypting key KS with the user B of the terminal 101. In this case, however, since it is assumed that the user B has no right to make access to the memory 128, he or she can not acquire the key information $RSA_{HPM}(HS1)$ and hence the key data $E_{KM}(KS)$.

When information or data for communication is to be encrypted by making use of $E_{KM}(KS)$ obtained in the manner as mentioned above, the cryptograph unit 119 is allowed to perform the processings mentioned below:

| Input: | IN1 | ← | data | |
| | IN2 | ← | $E_{KM}$ | (KS) |
| Computation: | KS | ← | $D_{KM}$ | (IN2) |
| | WORK | ← | $E_{KS}$ | (data) |
| Output: | OUT | ← | WORK | |

The encrypted data OUT (expressed by $E_{KS}(data)$) thus obtained is then transmitted to the terminal 101.

Upon reception of the encrypted message, the terminal 101 decrypts or restores the data from the encrypted message $E_{KS}(data)$ by using the data key KS held in the internal memory.

On the contrary, when an encrypted message or information $E_{KS}(data)$ is received from the terminal 101, the cryptograph unit 119 performs the processings mentioned below:

| Input: | IN1 | ← | EKS | (data) |
| | IN2 | ← | $E_{KM}$ | (KS) |
| Computation: | KS | ← | $D_{KM}$ | (IN2) |
| | data | ← | $E_{KS}$ | (IN1) |
| Output: | OUT | ← | data | |

By erasing the key information $E_{KM}(KS)$ held in the host main unit 116 after completion of the communication, the user B who has tapped $E_{KS}(data)$ and $RSA_{P1}(KS)$ from the communication network is inhibited from attempting to decode or decipher the data with the aid of the host 115.

Next, description will be made on the assumption that the host 115 and a given one of the terminals (e.g. terminal 101) conduct the cryptographic communication with each other by using the data key KS' designated by the host.

At first, the host main unit 116 reads out the public key P1 (122) corresponding to the destination terminal 101 from the memory 102 thereof and stores a random number R generated at random in a memory incorporated in the host main unit 116, while inputting the random number R to the cryptograph unit 119 as the input data, whereon numerical value data $RSA_{P1}(KS')$ 117 obtained as the output data from the cryptograph unit 119 is transmitted to the terminal 101.

For obtaining the key information $RSA_{P1}(KS')$, the cryptograph unit 119 performs the processings mentioned below by using the input data P1 (122) and R as well as the master key KM (120) held internally beforehands.

| Input: | IN1 | ← | P1 | |
| | IN2 | ← | R | |
| Computation: | KS' | ← | $D_{KM}$ | (IN2) |
| | WORK | ← | $RSA_{P1}$ | (KS') |
| Output: | OUT | ← | WORK | |

Through the processings mentioned above, the host main unit 116 can obtain an encrypted message $RSA_{P1}(KS')$ 117 which can be decrypted only by using the private key S1 (102) held by the terminal 101. By sending this encrypted message $RSA_{P1}(KS')$ to the terminal 101 by way of the communication network 113, the host system 115 can share or use the data encrypting key KS in common with the terminal 101.

Incidentally, it should be mentioned that although the random number R may simply be the data generated arbitrarily, the data key KS' will ultimately have a relation given by $R = E_{KM}(KS')$ due to the use of a decrypting or decoding function D.

On the other hand, when the terminal 101 receives the encrypted information $RSA_{P1}(KS)$, the following processings are carried out in the terminal 101.

| Input: | IN1 | ← | $RSA_{P1}$ | (KS') |
| Computation: | KS' | ← | $RSA_{S1}$ | (IN) |
| Output: | OUT | ← | KS' | |

Subsequent operations involved in the cryptographic communication at the terminal is same as those performed in the mode described hereinbefore. Accordingly, any further description will be unnecessary.

In this manner, the terminal 101 can obtain the data encrypting key KS'. Also in this case, the random number $R(=E_{KM}(KS'))$ held in the host main unit is erased after completion of the communication. Accordingly, there arises never such possibility that the other user (e.g. user B) having the right to access to the host system 115 might tap the data $E_{KS}(data')$ and $RSA_{P1}(KS')$ from the communication network to decipher the encrypted message or statement. Further, there may be conceived an unauthorized attempt of obtaining the private key S1 in an effort to derive the ordinary message data from the key information $RSA_{P1}(KS')$ and the encrypted communication message $E_{KM}(data)$. It goes however without saying that since the private key S1 does not originally exist in the host system 115, such deciphering of the data is impossible. By virtue of the cryptographic communication procedure described above, there can be realized a system for preventing any third party from an attempt of data decoding or decryption without imposing any restrictions or constraints to the operation of the cryptograph unit such as described hereinbefore in conjunction with RETKEY and macroinstructions in the prior art system.

It should here be mentioned that, of the cryptographic processings described above, the public key cryptographic processing $(RSA_X(Y))$ is performed at a processing rate of 10 Kbps, while the common key cryptographic processing is performed at a processing rate of 24 Mbps. Accordingly, it is preferred to perform the common key cryptographic processing for the cryption and decryption described hereinbefore only after the data key has been shared by the host and the terminal.

Figure 2:
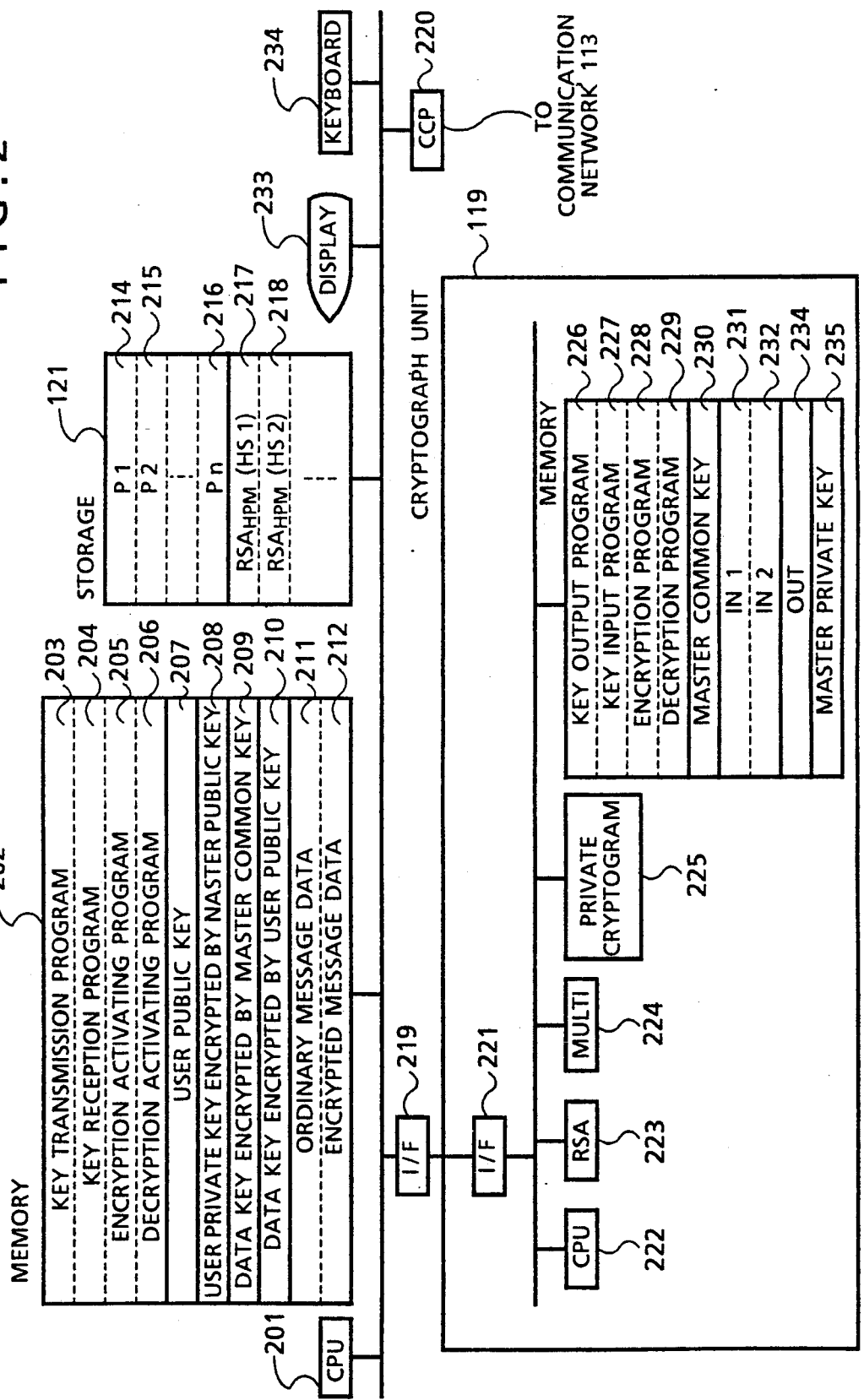
FIG. 2 is a block diagram showing in detail a structure of a host system in the cryptographic communication system shown in FIG. 1.

FIG. 2 is a block diagram for illustrating in detail a structure of the host system 115 shown in FIG. 1.

Referring to FIG. 2, four programs 203 to 206 stored in the memory 202 are executed by a central processing unit or CPU 201.

Of these four programs, a key transmission program 203 is activated when a data key is designated by the host system to be transmitted to a destination terminal. This program 203 serves to generate a random number 209 (which ultimately becomes a data key encrypted by the master key), read out one of the public keys P1 (214) to Pn (216) from the storage unit 121, make the cryptograph unit generate the data key 210 encrypted with the one public key and send the data key to the communication network 113 by way of a communication control processor (also referred to as CCP in abbreviation). The cryptograph unit 119 responds to the call from the key transmission program 203 by activating a key output program 226 incorporated in the cryptograph unit 119. A key reception program 204 is activated when a terminal issues a request for cryptographic communication to the host system 115 by designating a data key. This key reception program 204 serves to input the data key encrypted by the public key (e.g. HP1) which has been received from the communication network 113 through the CCP 220 and the user private key encrypted by the master public key (e.g. $RS_{HPM}(HS1)$ 217) which has been read out from the storage unit 121 to the cryptograph unit to obtain the data key encrypted by the master common key (KM) (209). The cryptograph unit 119 responds to a call from the key reception program 204 to thereby activate a key input program 227 incorporated in the cryptograph unit 119. An encryption activating program 205 serve to input an ordinary message data prepared previously by the operator and the data key encrypted by the master common key (KM) (209) to the cryptograph unit to thereby obtain the encrypted message data 212 which is then transmitted to the communication network through the communication control processor or CCP 220. The cryptograph unit 119 responds to a call from an encryption activating program 205 to thereby activate an encrypting program 228 incorporated in the cryptograph unit 119. A decryption activating program 206 serves to input to the cryptograph unit the data key encrypted by the master common key (KM) (209) and the encrypted message 212 sent from the terminal by way of the communication network 113 and the CCP 220 to thereby obtain the ordinary message data 211 which is then displayed on a display unit 233. The cryptograph unit 119 responds to a call from the decryption activating program 206 by activating a decrypting program 229 incorporated in the cryptograph unit 119.

Figure 3:
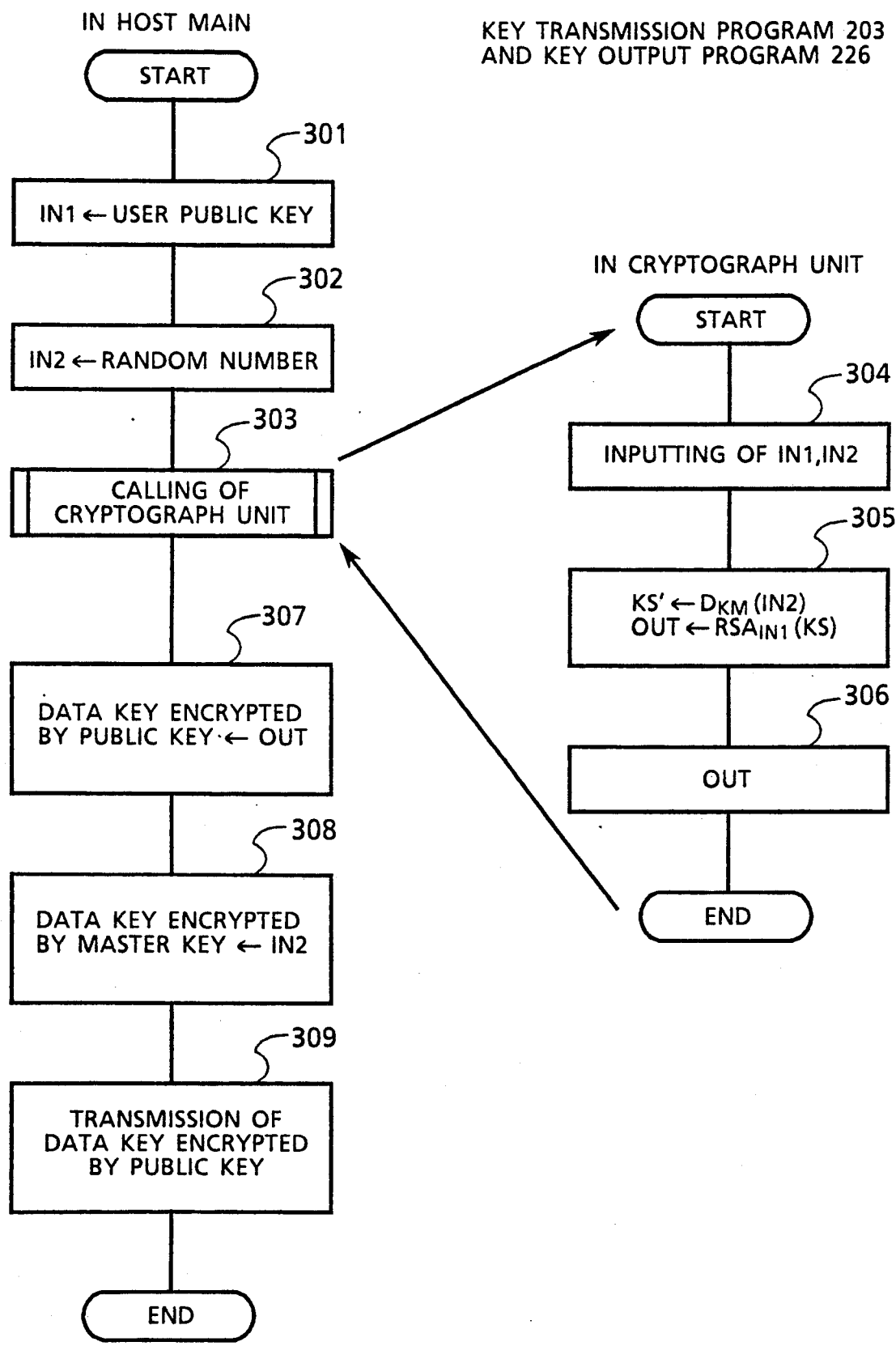
FIG. 3 is a chart for illustrating a processing flow of a key transmission program executed in the host system.

FIG. 3 shows in flow charts details of the key transmission program 203 and the key output program 226.

At a step 301, one of the pubic keys which corresponds to the destination terminal is selected from the storage unit 121 and placed in a variable IN1. In the case of the illustrated embodiment, it is set such that IN1←P1.

At a step 302, a random number R is generated randomly and placed in a variable IN2. In the case of the illustrated embodiment:

IN2←R

The random number R thus generated corresponds ultimately to the data encrypting key KS' encrypted by the master key KM, as described hereinbefore. Accordingly, assumption may be adopted such that the random number R equals $E_{KM}(KS')$. Further, let's represent by $E_X(Y)$ an encrypted message resulting from the encryption of data Y by a key X in accordance with a conventional cryptographic algorithm of a secreted algorithm type.

At a step 303, the cryptograph unit 119 is called, whereon the input data IN1 and IN2 mentioned previously are supplied for allowing the cryptograph unit 119 to execute the key output program 226 incorporated in the cryptograph unit 119. More specifically, the input data IN1 and IN2 are supplied (step 304), whereon the following calculations are performed.

$KS' \leftarrow D_{KM}(IN2)$ $OUT \leftarrow RSA_{IN1}(KS')$

At this juncture, $D_X(Y)$ represents ordinary message data which results from decryption of data Y by using a key X in accordance with a conventional cryptographic algorithm of the algorithm secreted type. Further, computation of $D_{KM}(IN2)$ is performed by a secrete cryptogram 225 while computation of $RSA_{IN1}(KS')$ is performed by using the RSA 223 (step 305). The result of this computation, i.e. $OUT = RSA_{P1}(KS')$ is then outputted (step 306).

At a step 308, the random number R ($= E_{KM}(KS')$) is placed in the memory 209.

At a step 303, the data encrypted by the public key ($RSA_{P1}(KS')$) in the memory 210 is sent out to the communication network 113 by way of the communication control processor (CCP) 220.

Figure 4:
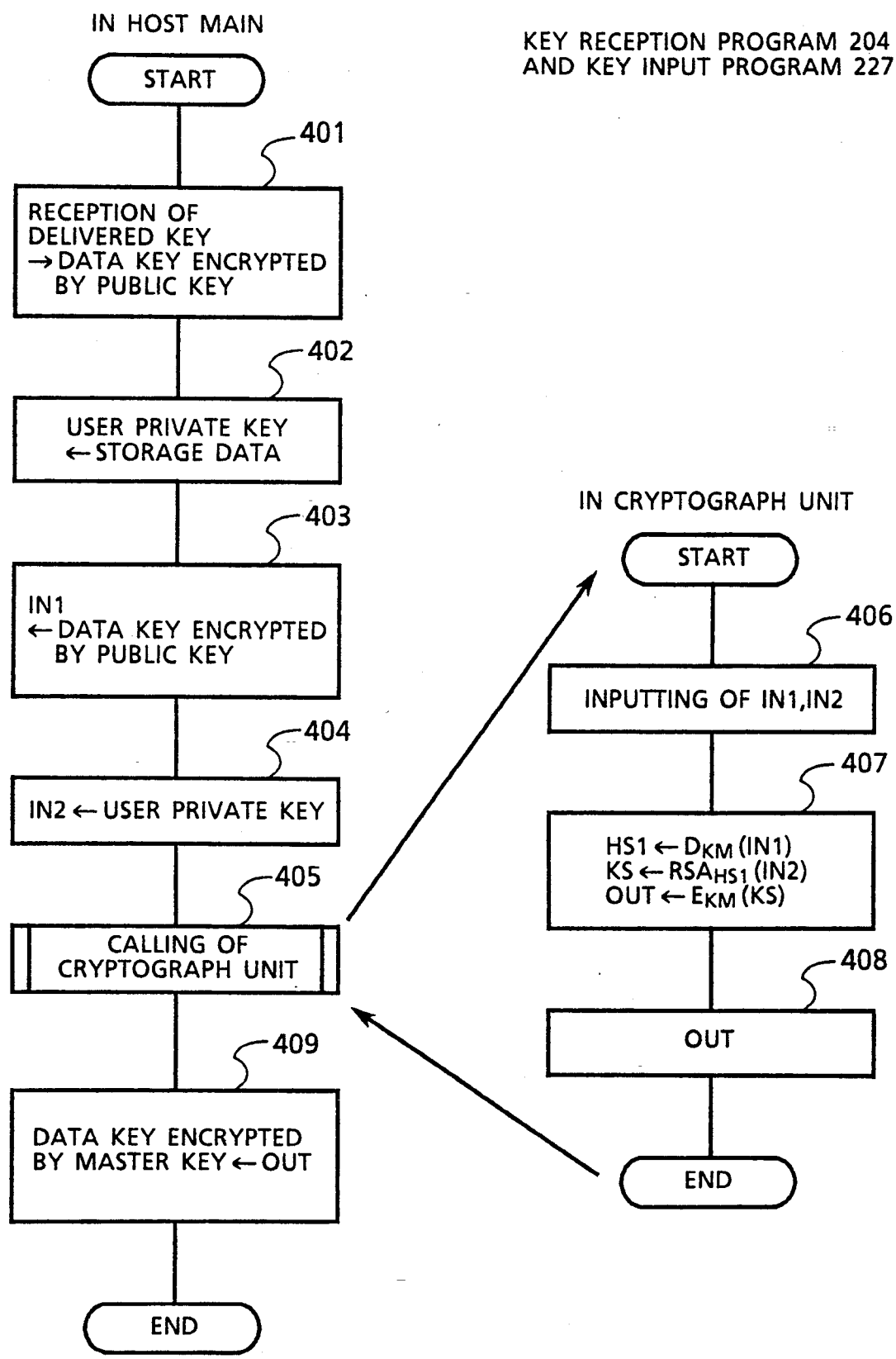
FIG. 4 illustrates a processing flow for illustrating execution of a key reception program in the host system.

FIG. 4 illustrates a processing flow of the key reception program 204 shown in FIG. 4.

At a step 401, the data key encrypted by the public key is received from the communication network by way of the communication control processor (CCP) 220 and loaded in the memory 210. In the case of the illustrated embodiment, the key encrypted by the public key is $RSA_{HP1}(KS)$. This key $RSA_{HP1}(KS)$ is transmitted to the host system 115 from the terminal 101 and corresponds to the data encrypting key KS generated and encrypted with the public key HP1 (103) in the terminal 101.

At a step 402, $RSA_{HPM}(HS1)$ stored previously at a storage area 217 iS read out to the memory 208.

At a step 403, data key encrypted by the public key which is stored in the memory 210 is placed in the variable IN1. Expressing by formula, $IN1 \leftarrow RSA_{HP1}(KS)$ At a step 404, the user private key encrypted with the master public key which is stored in the memory 208 is set at the variable IN2. Expressing by formula, $IN2 \leftarrow RSA_{HPM}(KS1)$ At a Step 405, the cryptograph unit 119 is called with the abovementioned IN1 and IN2 as the input data to thereby activate the key input program 227 which is incorporated in the cryptograph unit 119, for the purpose of allowing the data of the variables IN1 and IN2 to be loaded in the memories 231 and 232 through interfaces I/F 219 and I/F 221, respectively (step 406). Subsequently, the data IN2 of the memory 232 and the master private key of the memory 234 are inputted to the RSA 223 to perform the computation mentioned below:

$HS1 \leftarrow RSA_{HPM}(IN2)$

Next, the data IN1 of the memory 231 and data HS1 mentioned above the inputted to the RSA 223 to perform the computation mentioned below:

$KS \leftarrow RSA_{HS1}(IN1)$

Figure 5:
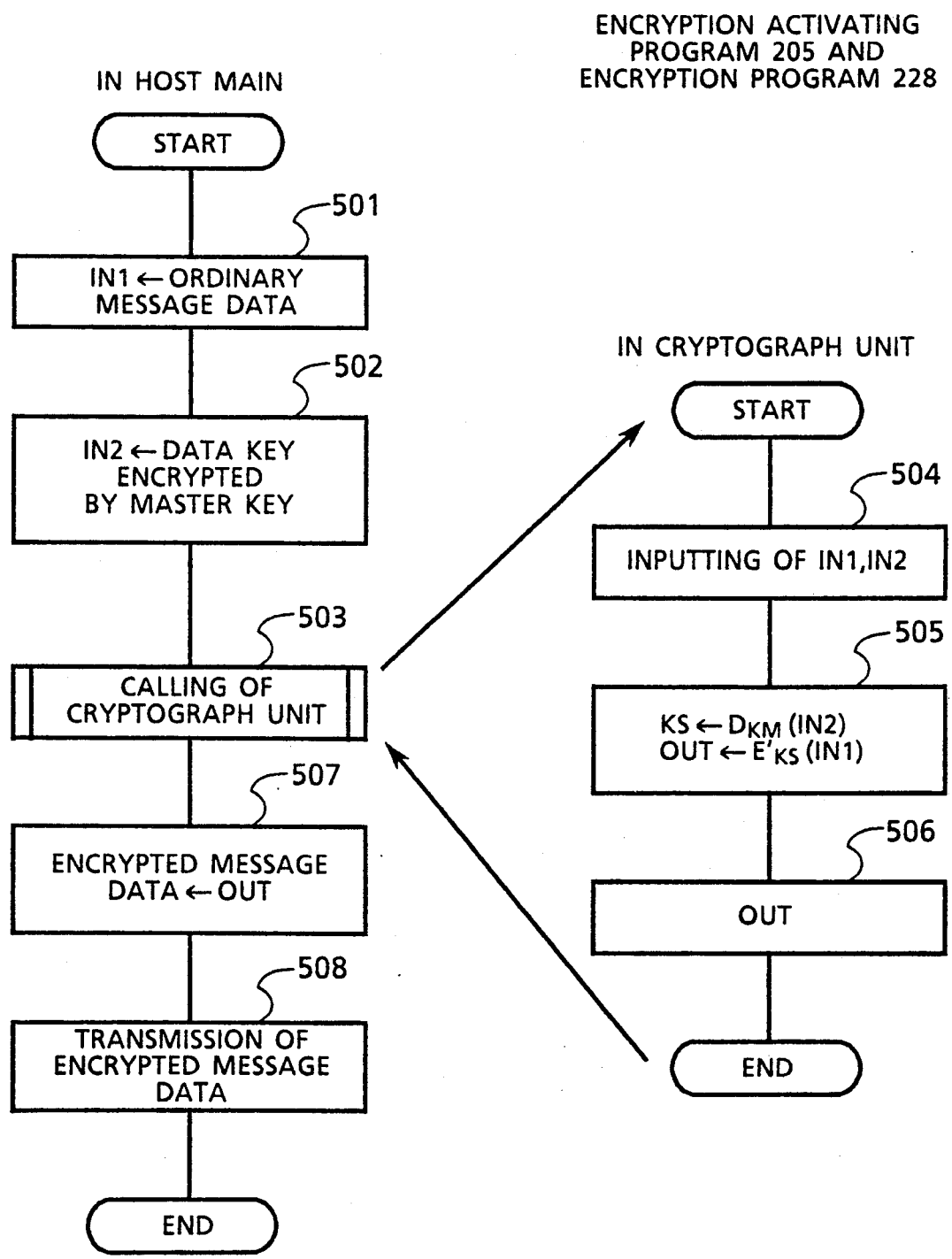
FIG. 5 is a chart for illustrating a processing flow of an encryption program executed by the host system.

By inputting the master common key and the KS mentioned above to the secret cryptogram 225, the following computation is executed:

OUT←$E_{KM}$(KS)
whereon the data OUT is written in the memory 223 (step 407). This data OUT is outputted through the interfaces I/F 221 and the I/F 219 (step 408). FIG. 5 illustrates processing flows of the encryption activating programs 205 and 228 shown in FIG. 2. Referring to the figure, at a step 501, ordinary message data (represented by "data") in the memory 211 is set at the variable IN1. Expressing by formula, IN1←data At a step 502, the data key encrypted with the master common key ($E_{KM}$(KS)) in the memory 201 is set at the variable IN2. Expressing by formula,

IN2←$E_{KM}$(KS)

At a step 503, the cryptograph unit 119 is called with the abovementioned IN1 and IN2 as the input data to thereby allow the cryptograph unit 119 to execute the encrypting program 223 incorporated therein. More specifically, the data IN1 and IN2 are placed in the memories 231 and 232 by way of the I/F 219 and the I/F 221, respectively (step 504). Subsequently, by inputting the data IN2 of the memory 232 and a master general-purpose key of the memory 230 to the secrete cryptogram 225, the following computation is executed:

KS←$D_{KM}$(IN2)

Thereafter, the data IN1 of the memory 231 and the abovementioned KS are inputted to a MULTI crypt algorithm 224 to execute the following computation (the crypt algorithm is referred to in Japanese paper "Development of Multi-media Encryption Algorithm, Hisecurity-MULT12 and Its Operation Mode, Proc. 1989 Joint Workshop on Information Theory and Its Applications, Cryptography and Information Security, Japan, 1989, pp. 167-173).

OUT←$E_{KS}$(IN1)
whereon the data OUT is written in the memory 223.

At this juncture, $E'_X(Y)$ represents the encrypted message data resulting from the encryption of data Y by the key X in accordance with a conventional cryptograph algorithm of a publicized type (step 505). The data OUT is outputted by way of the interfaces I/F 221 and I/F 219 (step 506).

At a step 507, the data OUT is written in the memory 212.

At a step 508, the encrypted message (OUT) in the memory 212 is sent to the communication network by way of the communication control processor (CCP) 220.

Figure 6:
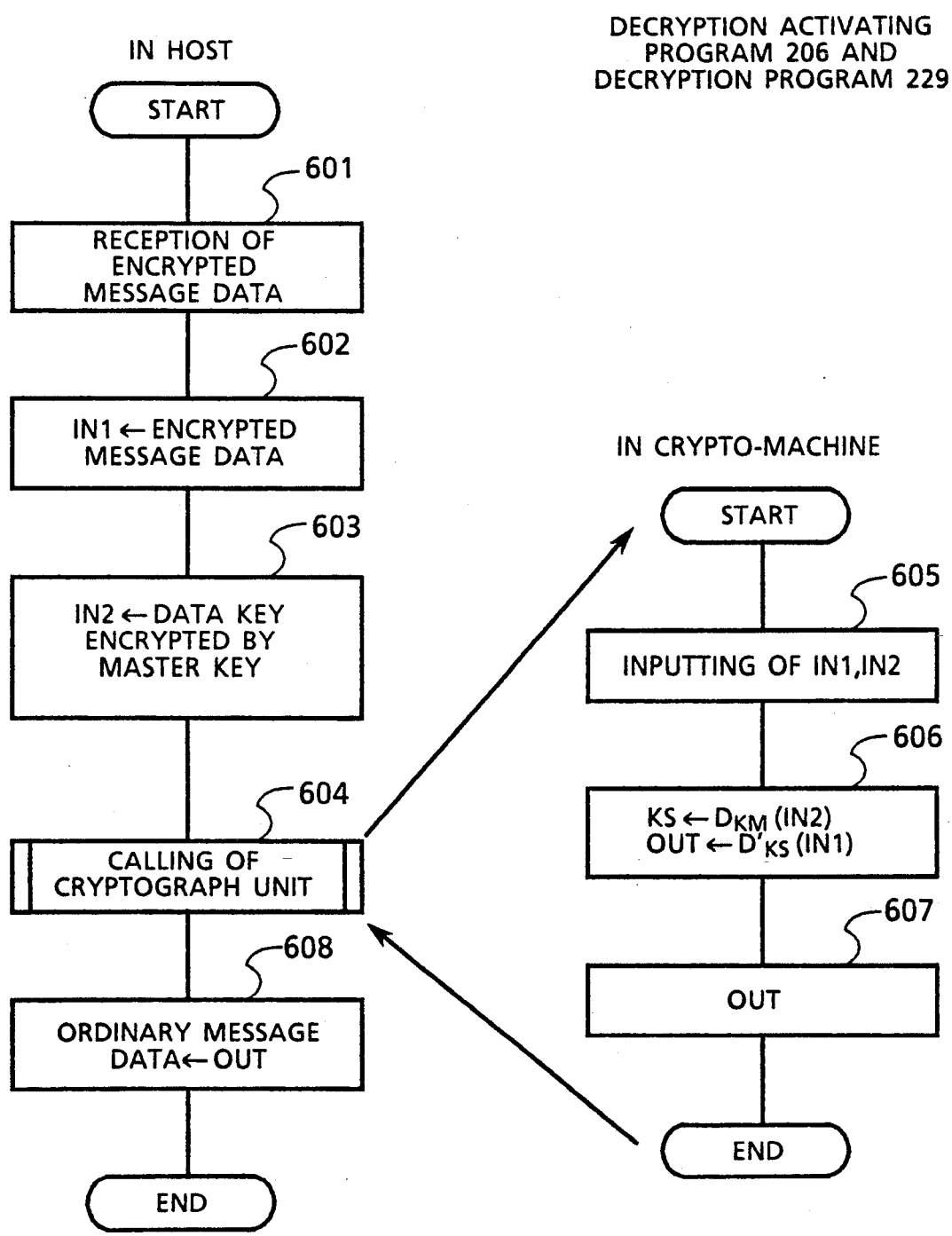
FIG. 6 is a chart for illustrating a processing flow for illustrating a decryption program executed by the host system.

FIG. 6 illustrates a processing flow of the description activating program 206 shown in FIG. 2.

Referring to the figure, at a step 601, the encrypted message data ($E_{KS}$(data)) is received from the communication network 113 by way of the CCP 220 to be subsequently written in the memory 212.

At a step 602, the encrypted message data of the memory 212 is set at the variable IN1. Expressing this by formula, IN1←$E'_{KS}$(data)

At a step 603, the data key encrypted with the master common key ($E_{KM}$(KS)) is set at the variable IN2. Expressing this by formula,

IN2←$E_{KM}$(KS)

At a step 604, the cryptograph unit 119 is called with the abovementioned IN1 and IN2 as the input data to thereby operate the decryption program 229 incorporated in the cryptograph unit 119. More specifically, the input data IN1 and IN2 are loaded in the memories 231 and 232, respectively (step 605). Next, by inputting the data IN2 of the memory 232 and the master common key of the memory 230 in the secret cryptogram 225, the following computation is performed:

KS←$D_{KM}$(IN2)
whereon the data IN1 of the memory 231 and the abovementioned KS are inputted to perform the following computation:

OUT←$D'_{KS}$(IN1)
The data OUT thus obtained is written in the memory 223.

It is assumed that $D'_X(Y)$ represents ordinary message data resulting from he decryption of the data Y by using the key X in accordance with a conventional cryptograph method of the algorithm publicized type.

In the case described above, OUT="data"(step 606). The data "data" in the memory 233 is then outputted y way of the interfaces (I/F) 221 and 219 (step 607).

At a step 604, the data "data" mentioned above is written in the memory 211 and at the same time displayed on the display screen 233.

In the foregoing description made in conjunction with FIGS. 5 and 6, it has been assumed that the data key KS designated by the terminal is used. However, it will readily be understood that similar operations can be performed also in the case where the data key KS' designated by the host system 115 is used, simply by rewriting R such that R=$E_{KM}$(KS').

Further, in the case of the embodiment described above, it is assumed that $E_X(Y)$ and $D_X(Y)$ are resulted, respectively, from encryption and description performed in accordance with the conventional cryptograph method of the algorithm secreted type, while $E'_X(Y)$ and $D_X(Y)$ are resulted, respectively, from encryption and decryption performed in accordance with a conventional cryptograph method of the algorithm publicized type. It should however be understood that the conventional cryptograph method of the algorithm publicized type may be adopted for obtaining $E_X(Y)$ and $D_X(Y)$ as well as $E'_X(Y)$ and $D'_X(Y)$. In this case, if the master common key leaks externally, there may arise possibility of data acquisition by a third party. However, since the master common key can not make appearance intact outside of the cryptograph unit, there is no problem concerning the security. Parenthetically, it should be mentioned that application of the conventional cryptograph method of the algorithm secreted type to $E_X(Y)$; $D_X(Y)$ as well as $E'_X(Y)$; $D'_X(Y)$ is a more preferable mode for carrying out the invention.

In the case of the embodiment described above, the data key KS is generated by executing the processing KS←$D_{KM}$(R)
when the random number R generated at random is inputted to the cryptograph unit. This is because of the intention to make the random number R eventually become the data encrypting key encrypted by the master common key. It should however be appreciated that without departing from the scope and effect of the invention, processing given by $$KS \leftarrow E_{KM}(R)$$

may be performed so that the random number R ultimately constitutes the data encrypting key decrypted by the master common key.

In the foregoing description of the embodiment, it is further assumed that the cryptographic communication is carried out between the host system and a terminal. However, inter-host cryptographic communication may equally be realized between a host system capable of executing the key transmission program 203 and another host system capable of executing the key reception program 204.

Next, description will be directed to a system structure for setting up or establishing the encrypted private keys (RSA$_{HPM}$(HS1), . . . ) Of the individual users which are to be recorded in the storage unit 121 of the host system 115.

Figure 7:
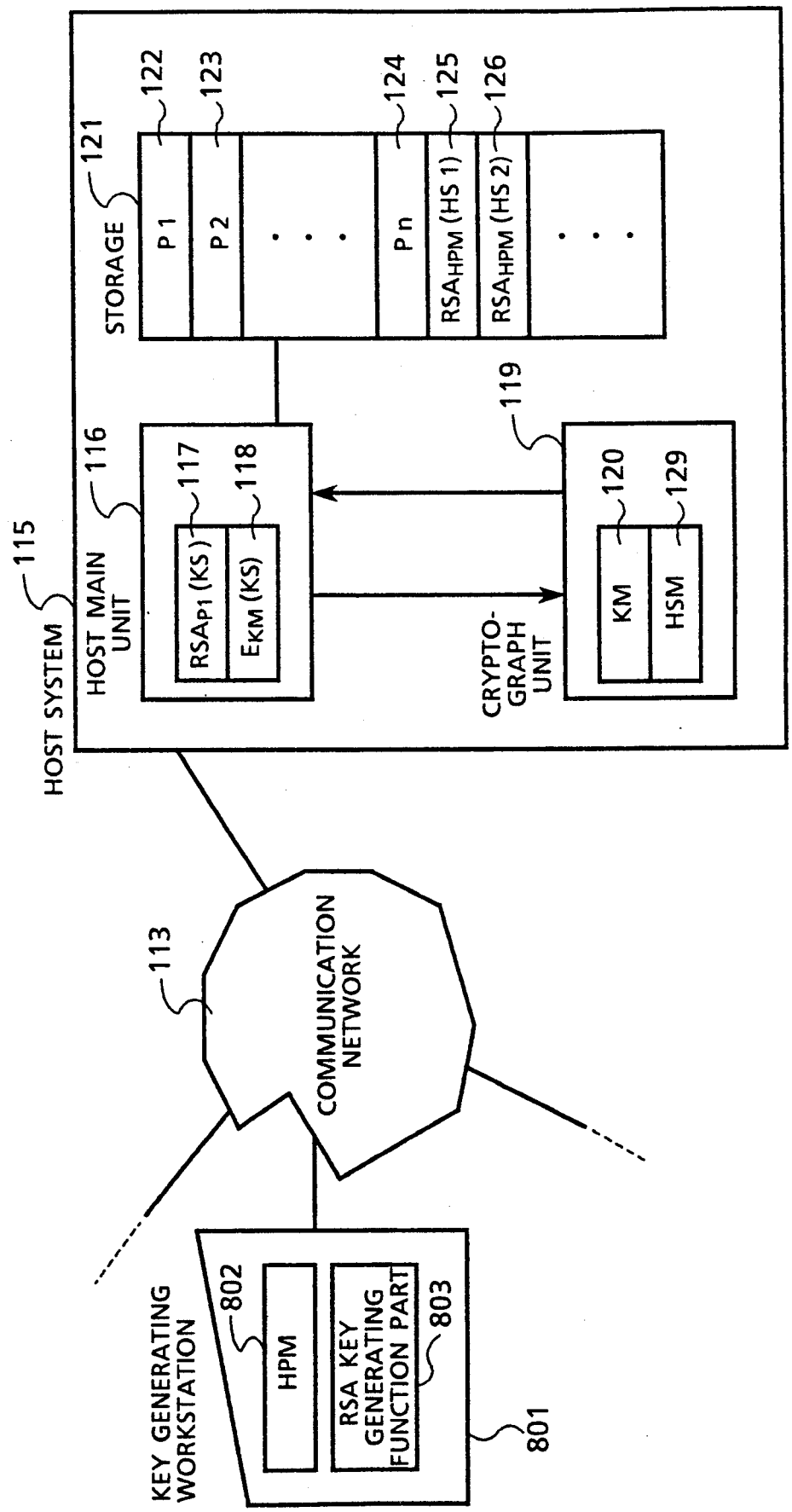
FIG. 7 is a diagram for illustrating in what manner the user private key can be set up in a storage unit incorporated in the host system.

FIG. 7 is a diagram for illustrating operations performed by a key generating workstation for establishing the user private key RSA$_{HPM}$(HS1) in the storage unit of the host system.

The host system 115 is capable of communicating with a key generating workstation 801 via the communication network 113.

According to the teachings of the invention incarnated in the instant embodiment, the private keys HS1 and HS2 conforming to the RSA public key cryptosystem are generated by an RSA key generating function unit 803 of the key generating workstation 801, wherein the keys HS1 and HS2 are set up as the private keys for the users A and B, respectively, of the host system 115.

In the key generating workstation 801, a public key HPM (802) of the RSA public key cryptosystem is previously set up in the key generating workstation 801. On the other hand, a private key HSM (129) paired with the abovementioned public key HPM (802) is set up in the cryptograph unit 119 of the host system 115.

Prepared in the storage unit 121 of the host system are a memory area 125 to which only the user A has the right to make access and a memory area 126 to which only the user B has the right to make access.

The key generating workstation 801 first generates the private keys HS1 and HS2 conforming to the RSA public key cryptosystem by making use of the RSA key generating function 803 and then encrypts the private keys HS1 and HS2 by the public key HPM (803) to thereby generate the encrypted information RSA$_{HPM}$(HS1) and RSA$_{HPM}$(HS2), respectively. Parenthetically, a general expression RSA$_X$(Y) represents an encrypted message resulting from the cryptographic translation of an input message (Y) by using a key X in accordance with the RSA public key cryptosystem.

For more particulars of the RSA key generating function unit 803, reference may be made to an article entitled "System for High Speed Generation of RSA Encrypting Key", The Institute of Electronics, Information and Communication Engineers of Japan D-I, Vol. J73-D-I, No. 3, pp. 213-220 (March, 1989).

The encrypted messages RSA$_{HPM}$(HS1) and RSA$_{HPM}$(HS2) are transmitted to the host main unit 116 via the communication network 113.

Upon reception of the encrypted messages mentioned above, the host main unit 116 writes the encrypted message RSA$_{HPM}$(HS1) in the memory area 125 while writing the encrypted message RSA$_{HPM}$(HS2) in the memory area 126.

In this manner, the private keys HS1 and HS2 are set up in the host system 115 in the encrypted form.

One of the advantageous effects of the instant embodiment is seen in that the private keys HS1 and HS2 can be set up in the encrypted form in the host main unit 116 and the storage unit 121, wherein the private keys HS1 and HS2 are protected against making appearance in the naked form (i.e. in the form of ordinary message) in the future. When the RSA cryptographic translation is to be performed by using HS1 and HS2, the encrypted messages RSA$_{HPM}$(HS1) and RSA$_{HPM}$(HS2) are transmitted to the cryptograph unit 119, whereon the decryption is performed by using the key HSM existing only in the cryptograph unit 119 to obtain the naked or decrypted keys HS1 and HS2 which are then used in the RSA cryptographic translation processing, wherein only the results of the cryptographic translation processing are outputted externally of the cryptograph unit 119. In other words, the private keys HS1 and HS2 can be set up in the host main unit 116 and the storage unit 121 to be utilized without need for decrypting these keys HS1 and HS2. By virtue of this, security of the private keys against external exposure can be ensured more positively.

Now referring to FIG. 8, description will be made of an embodiment which is directed to the transfer of encrypted user private keys (RSA$_{HPM}$(HS1), etc.) from the host system 115 to another one.

In general, when information processing system is expanded as a result of increases in the number of the subscriber terminals, there arises a need for distributing the functions of the host system (i.e. provision of the host function in multiplicity). In that case, it is desirable that each of the host functions distributed is capable of performing the same processing for a same user request.

However, from the viewpoint of security, it is desirable that the master common keys and the master private keys held in the cryptograph units connected externally to the individual hosts, respectively, should not be identical with one another. Further, when the functions of the host system 115 described previously are to be imparted to the other host system, at least the RSA$_{HPM}$(HS1) and the like mentioned above must be transferred in the form capable of being processed With security by the other host system(s).

Now referring to FIG. 8, description will be made of a concrete example of inter-host transportation or transfer of the data RSA$_{HPM}$(HS1) and others.

Figure 8:
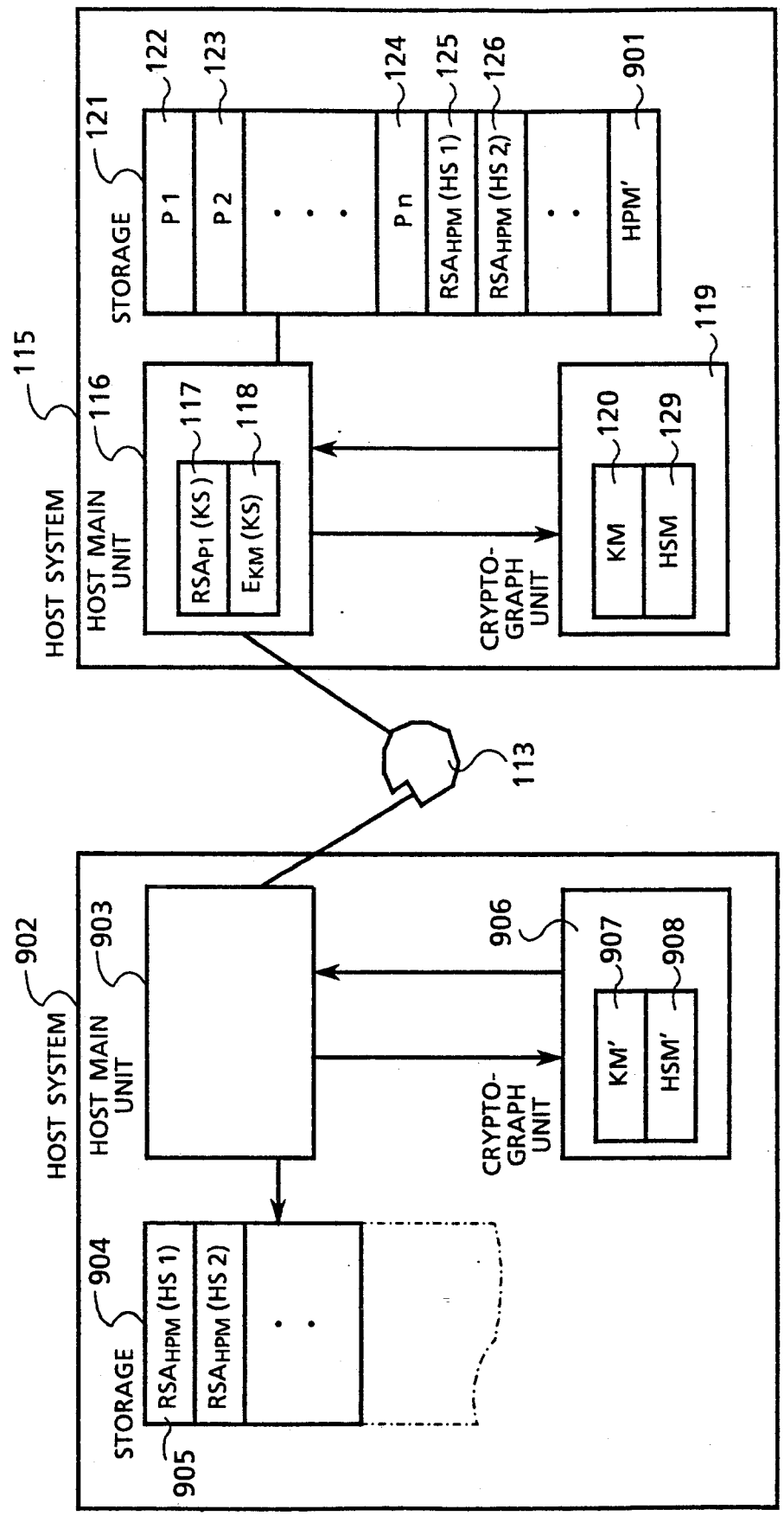
FIG. 8 is a schematic block diagram for illustrating operations involved in transportation or transfer of the user private key between host systems.
Figure 9:
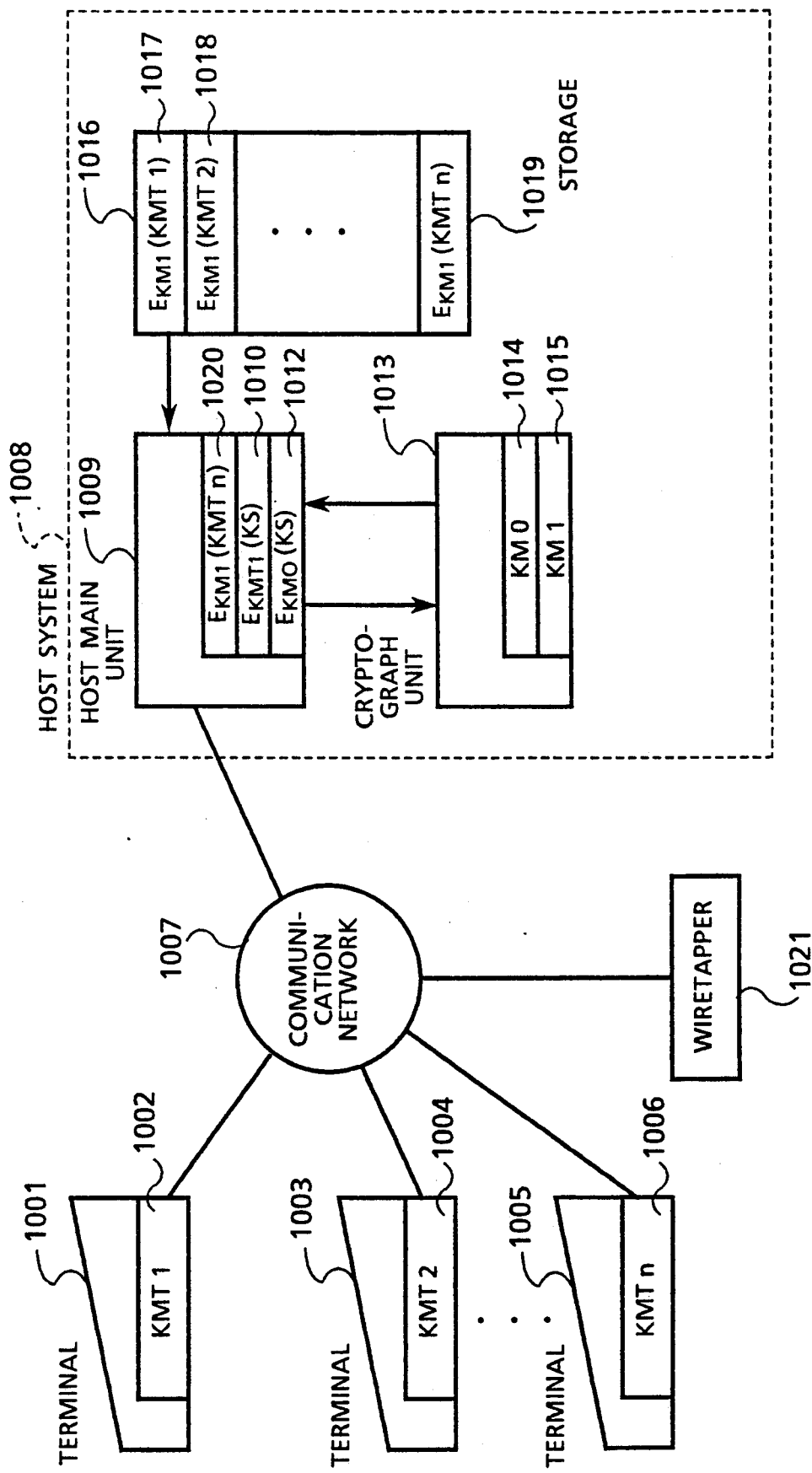
FIGS. 9 and 10 are schematic diagrams for illustrating cryptographic communication methods known heretofore, respectively.
Figure 10:
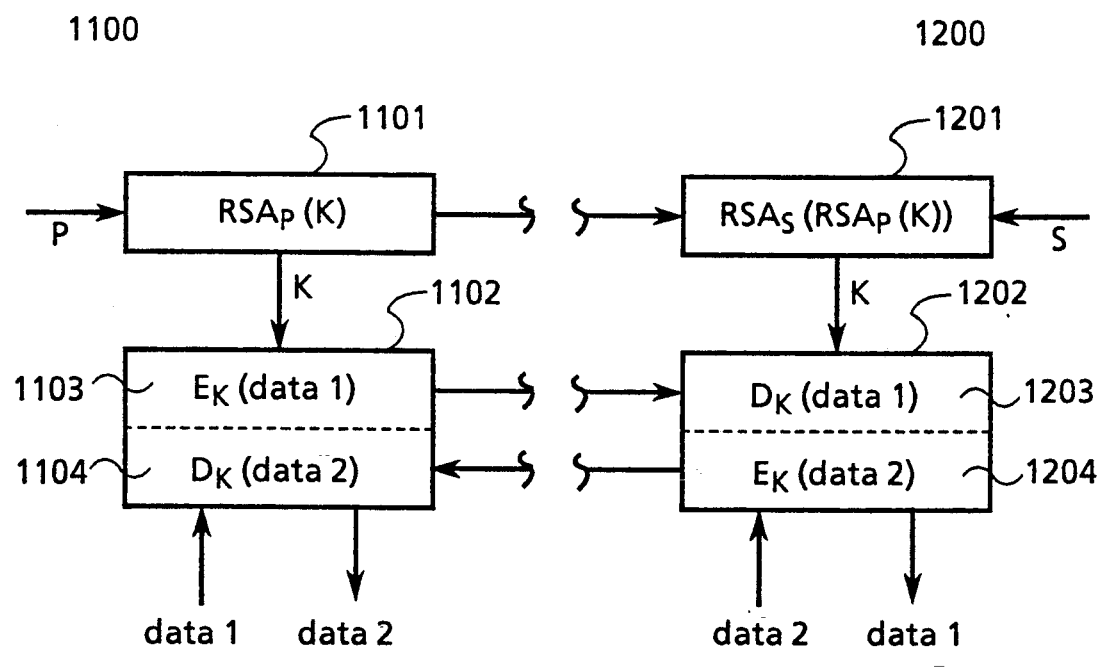

As shown in FIG. 8, a host system 115 is so connected as to be capable of communicating with another host system 902 by way of a communication network 113. In the case of the illustrated example, when a user A of the host system 115 moves to the other host system 902, the private key HS1 is moved with security to the host system 902 so that the user A can use his or her private key HS1 at the host system 902.

Recorded previously in the storage unit 121 of the host system are the private key RSA$_{HPM}$(HS1) 125 and RSA$_{HPM}$(HS1) 126 encrypted with the master public key HPM of the host system 115 as well as the master public key HPM' 901 of the host system 902. The master public key HPM' 901 is a key of the RSA public key cryptosystem, and is put in a paired relation with the master private key HSM' 908 recorded in the cryptograph unit 906 of the host system 902.

Operations of the host system 115 are performed in the manner elucidated below.

At first, the host main unit 116 reads out the data HPM' from the memory area 901, which data is then placed in the variable IN1. Further, the data $RSA_{HPM}(HS1)$ is read out from the memory area 125 to be placed in the variable IN2. These operations can be realized by relying on a procedure similar to ordinary program operation in the host computer. Next, the cryptograph unit 119 is called to perform the following operations.

| Input: | IN1 | ← | HPM' |
|---|---|---|---|
| | IN2 | ← | $RSA_{HPM}$ (HS1) |
| Computation: | HS1 | ← | $RSA_{HPM}$ (HS2) |
| | WORK | ← | $RSA_{HPM'}$ (HS1) |
| Output: | OUT | ← | WORK |

The processings to this end can be executed in the similar manner as in the case of the embodiment described previously.

The host main unit 116 receives the output value $OUT = RSA_{HPM'}(HS1)$ and sends it to the host system 902 by way of the communication network 113.

Upon reception of the data $RSA_{HPM'}(HS1)$, the host system 902 writes the received data in the area 905 to which only the user A 909 has the right to make access.

With the arrangement described above, there can be attained advantageous effects, which will be mentioned below. When the private key HS1 is transported or transferred from the host system 115 to another host system 902, the private key HS1 can be transported without being naked in the host main units 116 and 903 as well as in the storage units 121 and 904. Besides, after the transportation, the user A can make use of the private key HS1 similarly before the transportation has been done. In this way, the security in protecting the private key against being externally leaked can be ensured also in the transportation or transfer of the private key between the host systems.

In the foregoing, it has been assumed that the host systems 115 and 902 are mutually connected via the communication network through which the private key is transmitted. In this conjunction, it should be mentioned that the transmission of the key should more preferably be performed by using a line dedicated to this end.

As will be appreciated, there has been proposed according to the invention the cryptographic communication between a host computer adapted to be used by a plurality of users and a plurality of terminals connected through a communication network, in which deciphering of the encrypted message by a third party is positively prevented in the course of the cryptographic communication between host and terminal users, while making it possible that both the data terminal and the host computer designate the data key required for decrypting the encrypted message.

What is claimed is:

1. A cryptographic communication system, including a plurality of user terminals and a host computer interconnected by way of a communication network, in which cryptographic communication is performed between a given one of said user terminals and said host computer by using a first data key designated by said given user terminal or alternatively by using a second data key designated by said host computer, said host computer comprising:

cryptographic processing means including a processing part for performing a public key cryptographic processing and a common key cryptographic processing, and an internal memory part for recording a master common key and a master private key;

storage means for recording as user private key information those data that result from the public key cryptographic processing performed by using said master public key on a plurality of first user private keys which are in paired relation to first user public keys held internally of said user terminals, respectively; and control means for performing input/output control of said cryptographic processing means and said storage mans;

wherein when key designation information is received from a given one of said user terminals upon designation of the data key, the user private key information corresponding to said given user terminal is read out from said storage means, to thereby decrypt said first data key by said cryptographic processing means on the basis of said key designation information and said user private key information and generate first key information from said first data key through the common key cryptographic processing by using said master common key, said first key information being held in said control means;

while upon execution of cryptographic communication, said cryptographic processing means generates said first data key from said first key information through the common cryptographic processing by using said master common key for every encryption or decryption of messages for communication, to thereby encrypt or decrypt said message through the common key cryptographic processing by making use of said first data key.

2. A cryptographic communication system according to claim 1, wherein said cryptographic processing means responds to said data key designation to thereby decrypt the first user private key from said user private key information through the public key cryptographic processing by using said master private key, while decrypting said first data key through the public key cryptographic processing by using said first user private key, and generate said first key information from said first data key through the common key cryptographic processing by using said master common key.

3. A cryptographic communication system according to claim 1, wherein said host computer includes means for recording in said storage means a plurality of second user public keys which are in paired relation with second user private keys held in the individual user terminals, respectively;

means for holding a given random number as second key information in said control means for designating said second data key used in the cryptographic communication between said host computer and a destination user terminal destined for communication;

means for reading out the second user public key corresponding to said destination user terminal from said storage means;

means for causing said cryptographic processing means to generate second data key from said second key information through the common key cryptographic processing by using said master common key; and means for generating the key designation information to be transmitted to said destination user terminal on the basis of said second data key through the public key cryptographic processing by using said second user public key;

wherein upon execution of the cryptographic communication, said cryptographic processing means generates said second data key from said second key information through the common cryptographic processing by using said master common key for ever encryption or decryption of message for communication to thereby encrypt or decrypt said message through the common key cryptographic processing by using said second data key.

4. A cryptographic communication system according to claim 3, each of said user terminals including user storage means for storing said first user public key and said second user private key and a user cryptographic processing means for performing said public key cryptographic processing and said common key cryptographic processing, wherein for designating said first data key from said user terminal, said first data key is encrypted through the public key cryptographic processing by using said first user public key, and upon reception of said key designation information from said host computer, said user terminal operates to perform the public key cryptographic processing by using said second user private key to thereby generate the second data key from said key designation information, while upon execution of the cryptographic communication, said user terminal operates to perform encryption or decryption of said message through said common key cryptographic processing by using said first or second data key for every encryption or decryption of the message.

5. A cryptographic communication system, including a plurality of user terminals and a host computer interconnected by way of a communication network, in which cryptographic communication is performed between a given one of said user terminals and said host computer by using a first data key designated by said given user terminal or alternatively by using a second data key designated by said host computer, said host computer comprising:

cryptographic processing means including processing means for performing a public key cryptographic processing and a common key cryptographic processing, and internal memory means for recording a master common key and a master private key;

storage means for recording as user private key information data resulting from the public key cryptographic processing performed by using said master public key on a plurality of first user private keys which are in paired relation to first user public keys held internally of said user terminals, respectively; and control means for performing input/output control of said cryptographic processing means and said storage means;

said cryptographic communication system comprising a key information generating terminal connected to said host computer by way of said communication network;

said key information generating terminal including key generating means for generating a plurality of first public keys to be distributed to said user terminals, respectively, and a plurality of the first user private keys which are in paired relation to said user public keys, respectively;

wherein said key generating terminal performs the public key cryptographic processing by using said master public key for generating said user private key information from each of said user private keys, said user private key information being sent to said storage means of said host computer.

6. A cryptographic communication system according to claim 5, further comprising a second host computer connected to said host computer by way of a communication network, wherein for transferring said user private key information to said second host computer, said host computer operates to decrypt the first user private keys from said user private key information through the public key cryptographic processing by using said master private key, generate second user private key information from each of said first user private keys through the public key cryptographic processing by using second master public keys which are in paired relation to second master private keys held by the cryptographic processing means of said second host computer, and send said second user private key information to said second host computer.

7. A cryptographic communication method for performing cryptographic communication between a host computer and a given one of plural terminals connected to said host computer by way of a communication network by using a data key designated by said given terminal, wherein said host computer comprises cryptographic processing means which includes a processing part for performing a public key cryptographic processing by using a pair of a public key and a private key and a common key cryptographic processing by using a common key, and an internal memory for storing a master common key and a master private key, storage means for recording as user private key information those data that result from the public key cryptographic processing performed by using a master public key on a plurality of user private keys which are in paired relation to user public keys held in the user terminals, respectively, and control means for performing input/output control between said storage means and said cryptographic processing means, said method comprising the steps of:

responding to data key designation of a given one of said user terminals for causing said cryptographic processing means to decrypt said data key from said user private key information and encrypted data key received from said user terminal through the common key cryptographic processing by using said master common key and holding said key information in said control means; and generating, upon execution of the cryptographic communication, data key from said key information through a common key cryptographic processing by using said master key for every encryption or decryption of a message to thereby encrypt or decrypt said message through the common key cryptographic processing by using said data key.

8. A cryptographic communication method according to claim 7, wherein upon said data key designation, the first user private key is decrypted from said user private key information through the public key cryptographic processing by using said master private key, while said encrypted data key is decrypted through the public key cryptographic processing by using said user private key, and wherein said key information is generated from said first data key through the common key cryptographic processing by making use of said master common key.

9. A cryptographic communication method according to claim 7, wherein in said user terminal, a given one of the data keys is encrypted through the public key cryptographic processing by using the user public key recorded in an internal memory of the user terminal upon said data key designation, while a message for communication is encrypted or decrypted through the common cryptographic processing by using said data key for said cryptographic communication.

10. A cryptographic communication method for performing cryptographic communication between a host computer and a given one of plural terminals connected to said host computer by way of a communication network by using a data key designated by said host computer upon designation of a data key, wherein said host computer comprises storage means for storing a plurality of user public keys, cryptographic processing means which includes a processing part for performing a public key cryptographic processing and a common key cryptographic processing and an internal memory for storing a master common key, and control means for performing input/output control of said storage means and said cryptographic processing part, wherein said method comprises, for data designation, the steps of:

holding a given random number in said control means as key information;

generating a data key from said random number through the common key cryptographic processing by using said host common key in said cryptographic processing part;

generating key designation information to be transmitted to a destination user terminal from said data key by performing said public key cryptographic processing by using a user public key corresponding to said destination user terminal; and wherein for cryptographic communication, said method comprises:

the step of generating communication data key from said key information through a common key cryptographic processing by using said host common key for every encryption or decryption of a message to thereby encrypt or decrypt said message through the common key cryptographic processing by using said data key.

11. A cryptographic communication method according to claim 10, wherein said user terminal responds to said data key designation to thereby decrypt said data key from said key designation information received from said host computer through the public key cryptographic processing by using a user private key stored in a memory incorporated in said user terminal, while upon cryptographic communication, a message for communication is encrypted or decrypted by performing the common key cryptographic processing by using said data key.

12. A cryptographic communication apparatus connected to a plurality of user terminals for performing mutual cryptographic communication by using a data key designated by a given one of said user terminals, comprising:

cryptographic processing means including a processing part for performing a public key cryptographic processing and a common key cryptographic processing, and an internal memory part for recording a master common key and a master private key;

storage means for recording as user private key information those data that result from the public key cryptographic processing performed by using said master public key on a plurality of user private keys which are in paired relation to user public keys held internally of said user terminals, respectively; and control means for performing input/output control of said cryptographic processing means and said storage means;

wherein when data key designation is issued from a given one of said user terminals, the user private key information corresponding to said given user terminal is read out from said storage means, to thereby decrypt the data key by said cryptographic processing means on the basis of said encrypted data key received from said given user terminal and said user private key information and generate key information from said data key through the common key cryptographic processing by using said master common key, said key information being held in said control means;

while upon execution of cryptographic communication, said data key is decrypted from said key information through the common key cryptographic processing by using said master common key for every encryption or decryption of a message for communication, to thereby encrypt or decrypt said message through the common key cryptographic processing by making use of said first data key.

13. A cryptographic communication apparatus according to claim 12, wherein said storage means stores a plurality of user public keys which are in paired relation to the user private keys hold by the user terminal, respectively, for performing mutual cryptographic communication with a given one of said user terminals by using the data key designated by said cryptographic communication apparatus, holds a given random number as the key information in said control means upon designation of the data key for the destination user terminal, reads the user public key corresponding to said destination user terminal from said storage means, generates the data key from said key information through the common key cryptographic processing by using said master common key, and generates the key designation information to be transmitted to said destination by performing the public key cryptographic processing by using said user public key, while upon execution of cryptographic communication, the data key is decrypted from said key information through the common key cryptographic processing by using said master common key for every encryption or decryption of a message for communication, to thereby encrypt or decrypt said message through the common key cryptographic processing by using said data key.

* * * * *